(12) United States Patent
Tian

(10) Patent No.: US 12,311,599 B2
(45) Date of Patent: May 27, 2025

(54) MAGNETIC LOCKING SYSTEM FOR USE WITH THREE-DIMENSIONAL PRINTING SYSTEMS

(71) Applicant: SprintRay Inc., Los Angeles, CA (US)

(72) Inventor: Huijian Tian, Los Angeles, CA (US)

(73) Assignee: SprintRay Inc., Los Angeles, CA (US)

( * ) Notice: Subject to any disclaimer, the term of this patent is extended or adjusted under 35 U.S.C. 154(b) by 0 days.

(21) Appl. No.: 17/984,219

(22) Filed: Nov. 9, 2022

(65) Prior Publication Data

US 2024/0083113 A1   Mar. 14, 2024

Related U.S. Application Data

(60) Provisional application No. 63/405,369, filed on Sep. 9, 2022.

(51) Int. Cl.
*B29C 64/245*     (2017.01)
*B33Y 30/00*     (2015.01)

(52) U.S. Cl.
CPC ............ *B29C 64/245* (2017.08); *B33Y 30/00* (2014.12)

(58) Field of Classification Search
CPC ..... B29C 64/245; B29C 64/20; B29C 64/205; B29C 64/209; B29C 64/214; B29C 64/218; B29C 64/223; B29C 64/227; B29C 64/232; B29C 64/236; B29C 64/241; B29C 64/25; B29C 64/255; B29C 64/259;

(Continued)

(56) References Cited

U.S. PATENT DOCUMENTS

2017/0305349 A1\*  10/2017  Naboulsi ................ B60R 1/025
2018/0311795 A1\*  11/2018  Morton ..................... H01F 7/04

FOREIGN PATENT DOCUMENTS

CN     206690551 U       12/2017
CN     108724702 A  \*  11/2018  ........... B29C 64/124

(Continued)

OTHER PUBLICATIONS

"Diametrically Magnetized Magnet," SDM Magnetics Co., Ltd., 2022, retrieved from magnet-sdm.com on Nov. 13, 2023. (https://www.magnet-sdm.com/diametrically-magnetized-magnet/) (Year: 2022).\*

(Continued)

*Primary Examiner* — Jamel M Nelson
(74) *Attorney, Agent, or Firm* — Jafari Law Group Inc.

(57) ABSTRACT

A magnetic locking system for securing a printing platform to a print arm within a three-dimensional (3D) printing system is provided. First and second magnets are configured with an end of the print arm, and a locking plate formed of a material that is attracted to magnetic fields is configured with the printing platform. The magnets are configured with a moving assembly that toggles the magnets with respect to one another between a first position and a second position, thereby varying the overall magnetic force generated by the magnets. When in the first position, the magnet applies an attractive magnetic force to the locking plate that secures the printing platform. When in the second position, the attractive magnetic force is reduced or eliminated, and the printing platform is released. The system provides a consistent and repeatable magnetic locking force between a printer arm and a printing platform.

5 Claims, 10 Drawing Sheets

(58) Field of Classification Search
CPC ... B29C 64/264; B29C 64/268; B29C 64/273; B29C 64/277; B29C 64/286; B29C 64/291; B29C 64/295; B33Y 10/00; B33Y 30/00
See application file for complete search history.

(56) References Cited

FOREIGN PATENT DOCUMENTS

| | | | |
|---|---|---|---|
| CN | 109693382 A | 4/2019 | |
| CN | 111761813 A | 10/2020 | |
| CN | 215320654 U | 12/2021 | |

OTHER PUBLICATIONS

"Detent," Merriam-Webster, accessed at https://Avww.merriam-webster.com/dictionary/detent on 09-26-2024. (Year: 2024).*

* cited by examiner

MAGNETIC LOCKING SYSTEM FOR USE WITH THREE-DIMENSIONAL PRINTING SYSTEMS

PRIORITY AND RELATED APPLICATIONS

This application claims priority to and is a Non-Provisional Application of U.S. Provisional Application No. 63/405,369, filed on Sep. 9, 2022, the disclosure of which is incorporated by reference in their entirety.

FIELD OF THE INVENTION

This invention relates to three-dimensional (3D) printing systems, including a magnet locking system for use with 3D printing systems.

BACKGROUND

Three-dimensional (3D) printing systems have become popular throughout the world. With such systems, a printing platform is typically removable from its corresponding printer arm in between printing sessions. Each time the printing platform is placed back onto the printer arm, it is locked in place using a locking mechanism that applies a locking force. The repeatability and reproducibility of the locking force affects the printing quality of the 3D printing system and its ability to reproduce like objects.

Current locking mechanisms used for this purpose typically rely on a user applying torque (e.g., to a knob) that in turn applies a locking force to the components. However, because the locking mechanisms are manual and rely on the user to apply repeatable torque, the locking force is oftentimes different each time the platform is attached to the arm.

Accordingly, there is a need for magnetic locking system to provide a repeatable locking force when securing a printing platform to a printer arm.

SUMMARY

According to the present invention, several embodiments of a magnet locking system for use with three-dimensional (3D) printing system are provided. One aspect of the invention involves a magnetic locking system for use in securing a print arm to a printing platform within a three-dimensional (3D) printing system. The magnetic lock system may include: a member configured with the printing platform and comprising a material that is attractable to magnetic forces; one or more magnets configured with the print arm and configurable to apply an attractive magnetic force to the member; a magnet moving mechanism configured to toggle at least one of the one or more magnets between a first position and a second position; wherein when in the first position, the one or more magnets provide a first attractive magnetic force with respect to the member, and when in the second position, the one or more magnets provide a second attractive magnetic force with respect to the member; wherein the first attractive magnetic force holds the member at an interface between the member and the one or more magnets, and the second attractive magnetic force releases the member from the interface.

In another aspect of the invention, a magnetic locking system for use within a 3D-printing system includes: a printing platform including a print arm coupling interface; a member configured with the printing platform at the print arm coupling interface and comprising a material that is attractable to magnetic forces; a print arm configurable with the printing platform at the print arm coupling interface; one or more magnets configured with the print arm and configurable to apply an attractive magnetic force to the member; a magnet moving mechanism configured to toggle at least one of the one or more magnets between a first position and a second position; wherein when in the first position, the one or more magnets provide a first attractive magnetic force with respect to the member, and when in the second position, the one or more magnets provide a second attractive magnetic force with respect to the member; wherein the first attractive magnetic force holds the member at the interface and the second attractive magnetic force releases the member from the interface.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

DETAILED DESCRIPTION OF EXEMPLARY EMBODIMENTS

In general, the system and method according to exemplary embodiments hereof includes magnetic locking system for use with three-dimensional (3D) printing systems. The magnetic locking system provides a consistent and repeatable locking force between a printer arm and a printing platform of a 3D printing system, thereby increasing the system's printing quality and its ability to reproduce like objects to a higher degree of accuracy.

Figure 1:
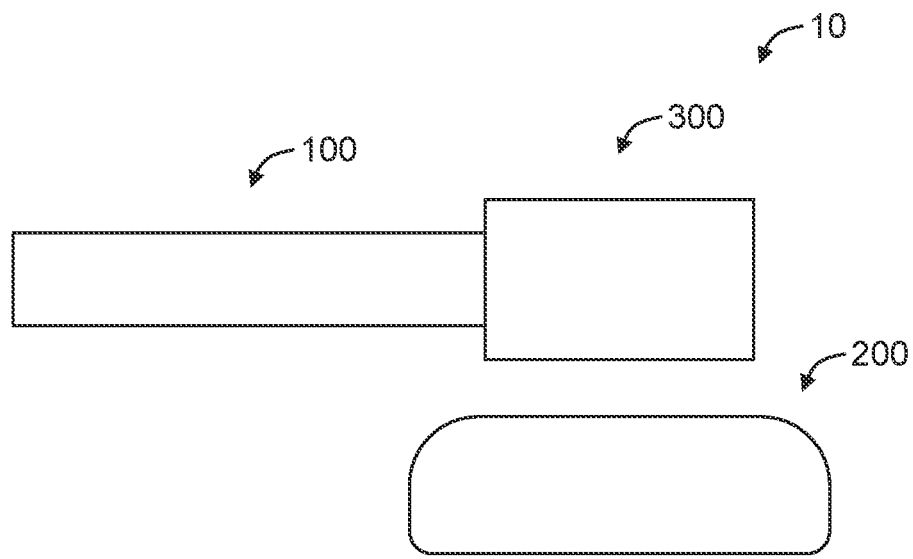
FIGS. 1-4 show aspects of a magnetic locking system configured with a printing arm and a printing platform in accordance with exemplary embodiments hereof.
Figure 2:
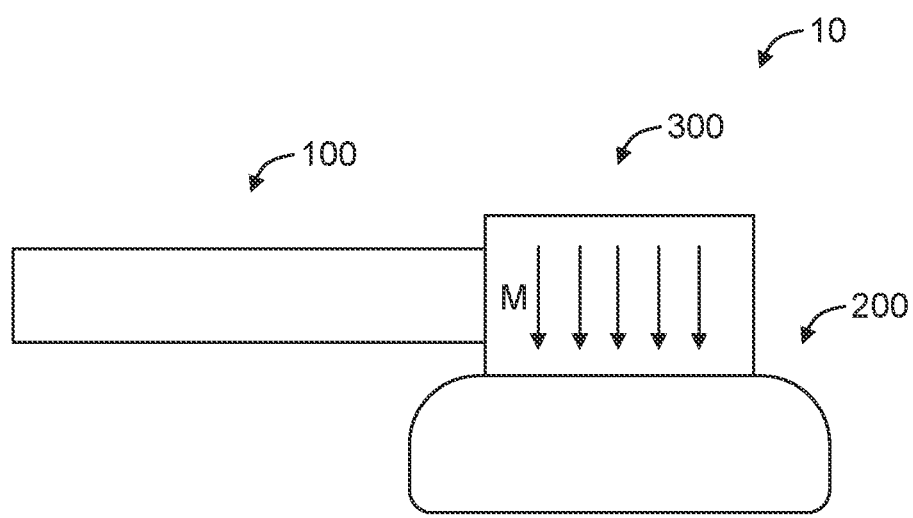

In one exemplary embodiment hereof, as shown in FIGS. 1-2, the magnetic locking system 10 (also referred to herein as simply the system 10) includes a magnetic locking assembly 100 configured with a printer arm assembly 200 and a printing platform assembly 300. In general, the magnetic locking assembly 100 is fixedly coupled to the printer arm assembly 200 and provides a repeatable and releasable locking force M between the printer arm assembly 200 and the printing platform assembly 300 when configuring the assemblies 200,300 together for use in a 3D printing system. FIG. 1 shows the magnetic locking assembly 100 deactivated and the printing platform assembly 300 disconnected from the printing arm assembly 200, and FIG. 2 shows the magnetic locking assembly 100 activated and the assemblies 300,200 secured together by the magnetic force M provided by the magnetic locking assembly 100. The system 10 also may include other elements as necessary for the system 10 to perform its functionalities as described herein or otherwise.

Figure 3:
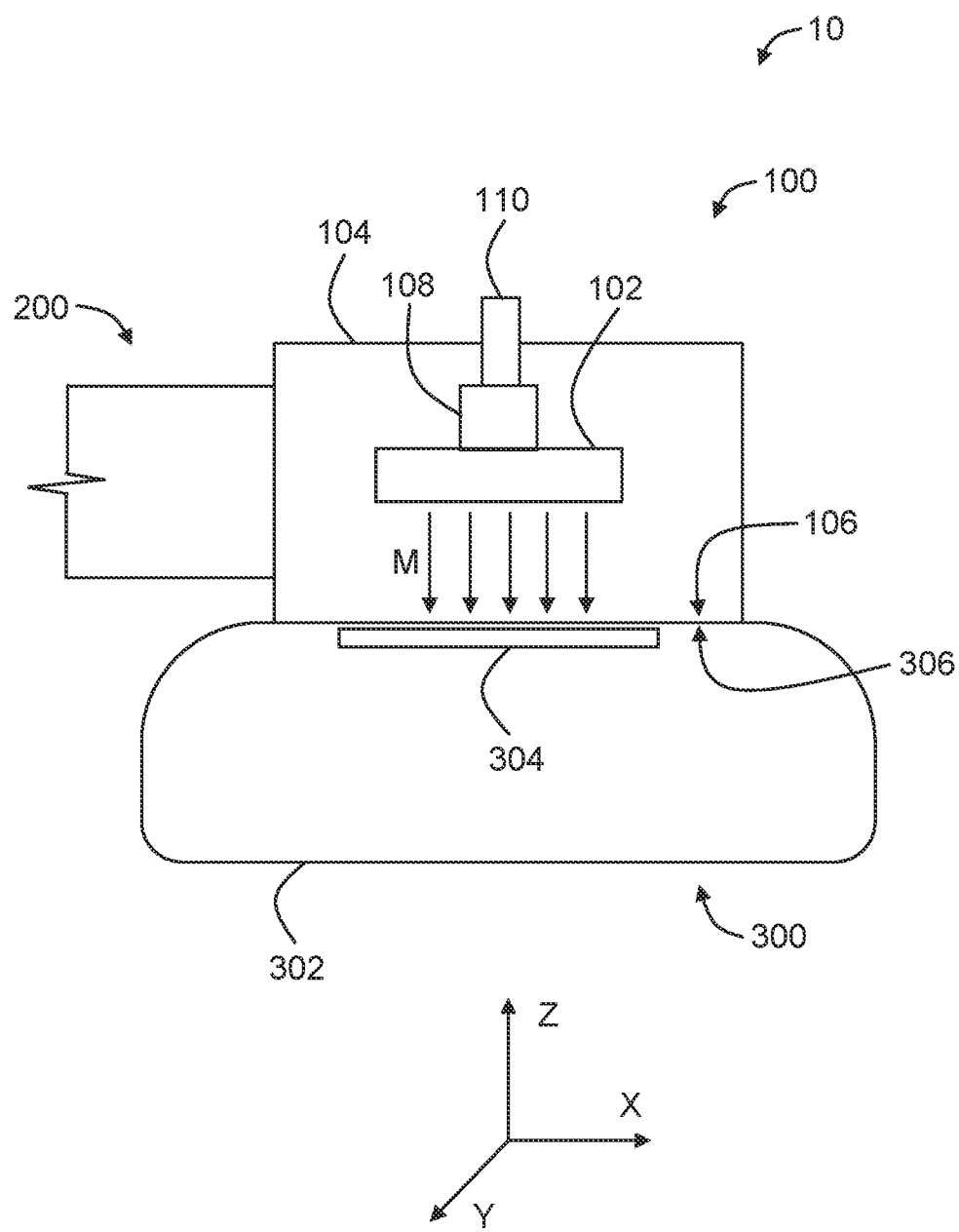
Figure 4:
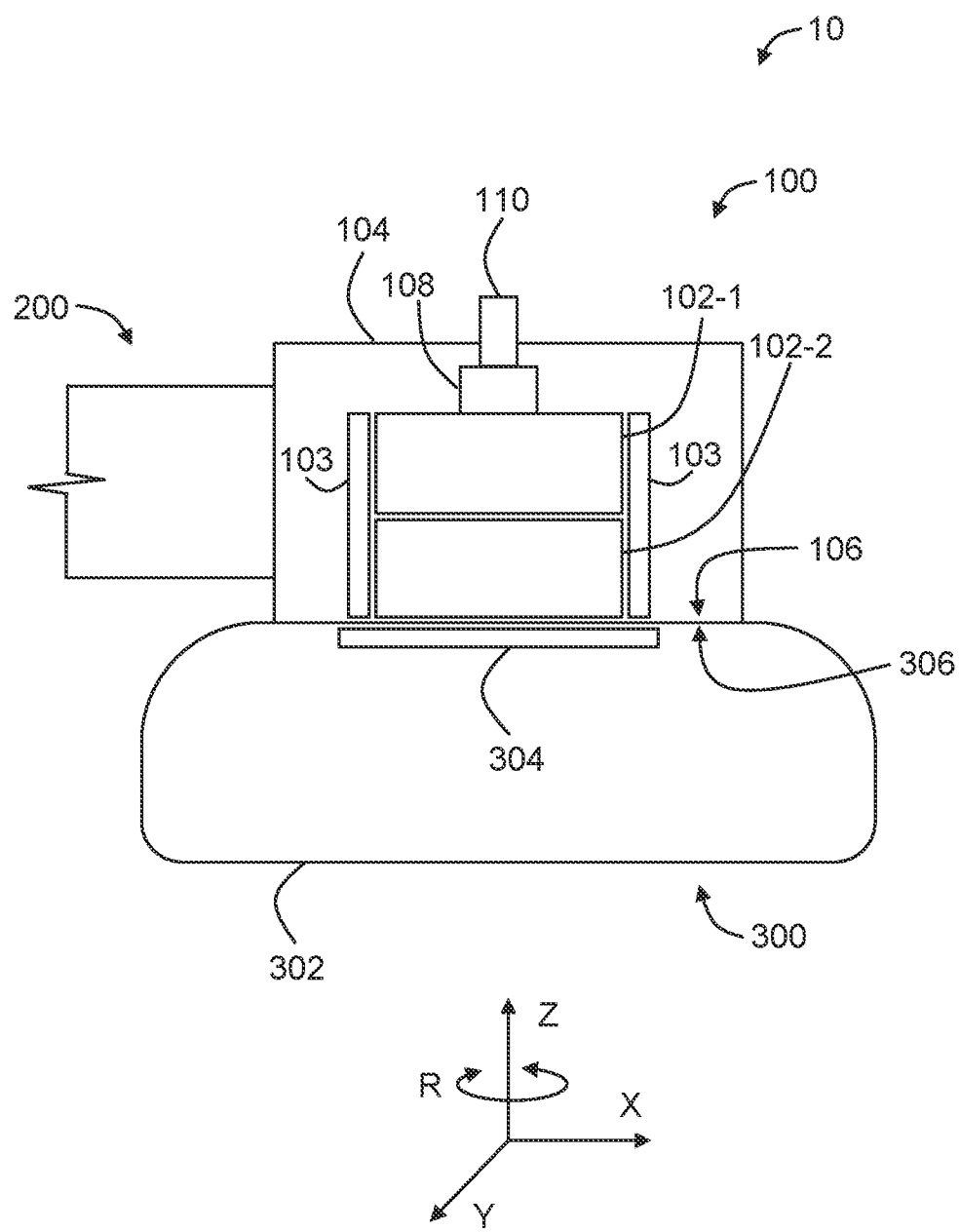

For the purposes of this specification, the assemblies 100, 200, 300 in FIGS. 1-3 are represented as generic blocks for demonstration. However, is it understood that the assemblies 100, 200, 300 may be formed as any shapes as required for the assemblies 100, 200, 300 to perform their respective functionalities. It also is understood that the printer arm assembly 100 and the printing platform assembly 300 include all of the structures, components, and elements necessary to perform printer arm and/or printing platform functionalities, respectively, as is known in the art, in addition to the additional aspects of the system 10 as described herein.

In some embodiments, as shown in FIG. 3, the magnetic locking assembly 100 includes one or more magnets 102 held within an outer housing 104. The magnets 102 may include permanent magnets, electromagnets, other kinds of magnets, and any combinations thereof. In addition, the printing platform assembly 300 includes a printing platform 302 coupled with one or more attraction plates 304 comprising materials that are attracted to magnetic fields (e.g., steel and/or other ferromagnetic materials). The attraction plate(s) 304 are coupled to the printing platform 302 at (or in close proximity to) an interface 306 between the magnetic locking assembly 100 and the printing platform 302, e.g., at the place of contact between the printing platform 302 and the magnetic locking assembly 100. In this way, the plate(s) 304 are held by the magnetic field M when the magnetic locking assembly 100 is activated. This will be described in further detail in other sections.

In some embodiments, the magnetic locking assembly 100 includes a combination of two or more magnets 102 that are arrangeable with respect to one another to create a combined magnetic field. In some embodiments, the two or more magnets 102 are arrangeable to create a combined magnetic field that applies an attractive magnetic force M to the attraction plate 304 adequate to hold the printing platform assembly 300 in place with respect to the magnetic locking assembly 100. In this case, the magnetic locking assembly 100 is activated (i.e., turned on). In other embodiments, the magnets 102 are arrangeable such that the combined magnetic force of the magnets 102 does not apply an adequate attractive magnetic force M to the attraction plate 304. In this case, the magnetic locking assembly 100 is deactivated and the printing platform assembly 300 may not be held in place with respect to the magnetic locking assembly 100.

Figure 5:
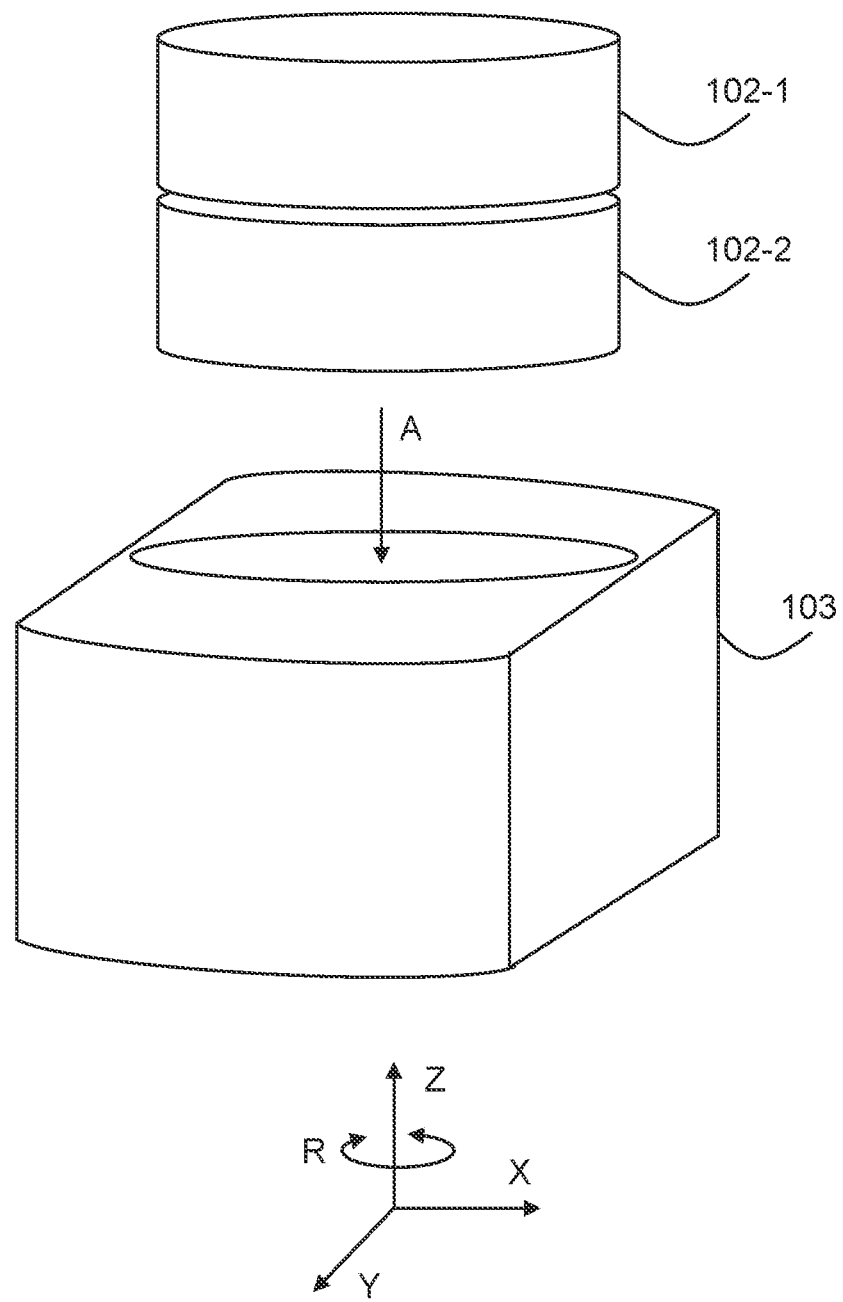
FIG. 5 shows aspects of a magnetic locking assembly in accordance with exemplary embodiments hereof.

In some embodiments, as shown in FIG. 5, the magnetic locking assembly 100 includes a first magnet 102-1 and a second magnet 102-2. In some embodiments, the first and second magnets 102-1, 102-2 are diametrically polarized disc magnets 102 in a stacked arrangement, with the first magnet 102-1 configured above the second magnet 102-2 and the magnets 102-1, 102-2 aligned about the Z-axis. It is preferable that the magnets 102-1, 102-2 are identical or similar. The magnets 102-1, 102-2 are preferably rare-earth magnets. Being diametrically polarized, each magnet's north and south poles are located on the curved side surfaces of the magnet 102, at opposite sides. In addition, in some embodiments, the first and second magnets 102-1, 102-2 are placed within a ferromagnetic housing 103 as represented by the arrow A. The magnets 102-1, 102-2 and the housing 103 are contained within the outer housing 104.

In some embodiments, as shown in FIG. 5, rotating the first magnet 102-1 (or the second magnet 102-2) about the Z-axis in the direction of the arrow R with respect to the second magnet 102-2 (or the first magnet 102-1) varies the overall magnetic field generated by the combined two magnets 102-1, 102-2. In a first position, the north pole of the first magnet 102-1 is generally aligned with the north pole of the second magnet 102-2, and the overall magnetic field generated by the combined magnets 102-1, 102-2 within the ferromagnetic housing 103 is generally maximized. In a second position, either the first magnet 102-1 or the second magnet 102-2 is rotated 180° thereby aligning the north pole of the first magnet 102-1 with the south pole of the second magnet 102-2. In this second position, the overall magnetic field generated by the combined magnets 102-1,102-2 within the ferromagnetic housing 103 is minimized (preferably approaching zero).

Given the above, the magnetic locking assembly 100 may be referred to as on (activated) when the first and second magnets 102-1, 102-2 are in the first position, and off (deactivated) when the first and second magnets 102-1, 102-2 are in the second position. Accordingly, during use, the magnetic locking assembly 100 may be deactivated to unlock the printing platform assembly 300 from the magnetic locking assembly 100 (and therefore from the printer arm assembly 200 attached thereto), and then activated when it is desired to lock the printing platform assembly 300 back to the magnetic locking assembly 100 (and to the printer arm assembly 200).

In some embodiments, the magnets 102 are configured with a magnet moving assembly 108 capable of moving the magnets 102 in any direction in three-dimensional space. In some embodiments, the magnet moving assembly 108 is designed to rotate the first magnet 102-1 and/or the second magnet 102-1 into the first and second positions as described above.

In some embodiments, the magnet moving assembly 108 is capable of toggling the magnets 102 from the first position to the second position, back to the first position, back to the second position, and so on. In this way, the magnet moving assembly 108 may be used to turn on and off the magnetic locking assembly 100 by toggling the magnets 102 between the first and second positions.

In some embodiments, it is preferable that the magnet moving assembly 108 provide repeatable movement of the magnets 102 from the first position to the second position, back to the first position, back to the second position, and so on, such that the placement of the magnets 102 in the first position and/or in the second position is repeatable. In this way, the attractive magnetic force M applied between the magnets 102 and the attraction plate 304 when the magnetic locking assembly 100 is activated also is repeatable. Accordingly, the printing platform assembly 300 may be secured to the magnetic locking assembly 100 using a repeatable force, and the placement of the printing platform assembly 300 with respect the printer arm assembly 100 also may be highly repeatable and consistent between uses.

In some embodiments, the magnet moving assembly 108 is controlled to toggle the magnets 102 between the first position and the second position by an activation mechanism 110. In some embodiments, the activation mechanism 110 may be manually activated and may include a knob, a lever, a slider, other types of manual activation devices, and any combinations thereof. In other embodiments, the magnet moving assembly 108 may be electronic and the activation mechanism 110 may include an electronic device such as a button, a switch, a touchscreen element, other types of electronic activation devices, and any combinations thereof.

In some embodiments, if the magnets 102 include an electromagnet, the magnetic locking assembly 100 may be activated by simply turning on the electromagnet 102. In this case, it is preferable that the turning on of the electromagnet 102 be repeatable, with a repeatable voltage and/or current, such that the magnetic force M applied by the electromagnet 102 to the attraction plate 304 each time the electromagnet 102 is turned on also is repeatable. In addition, the electromagnet 102 may not require repositioning via a magnet movement assembly 108, although this too is contemplated.

Figure 6:
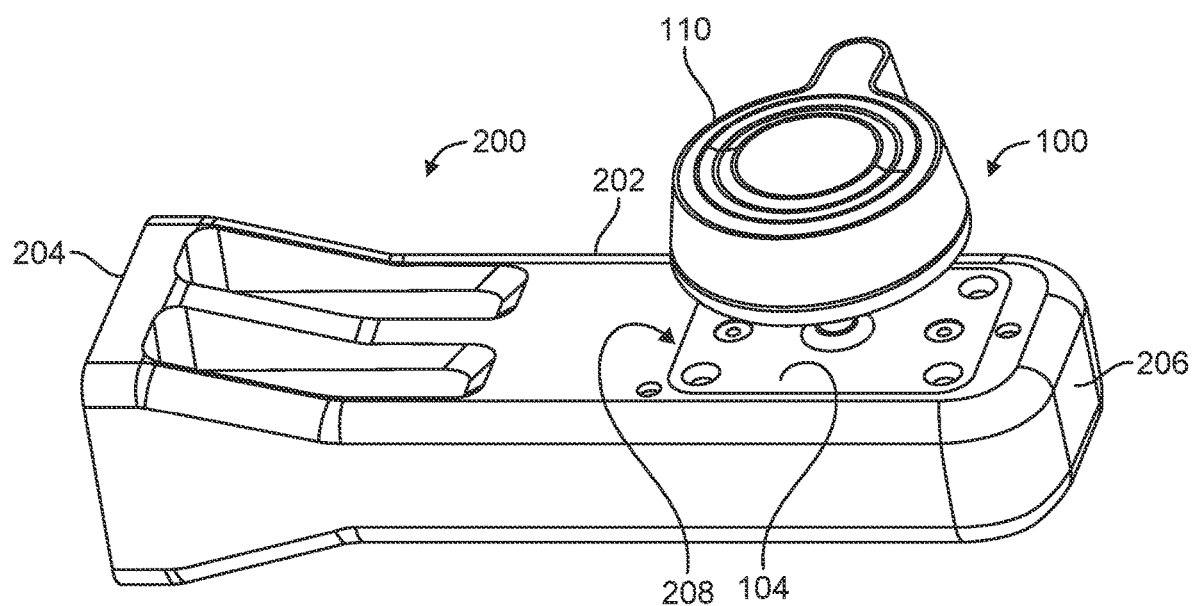
FIG. 6 shows aspects of a printer arm configured with a magnetic locking assembly in accordance with exemplary embodiments hereof.
Figure 7:
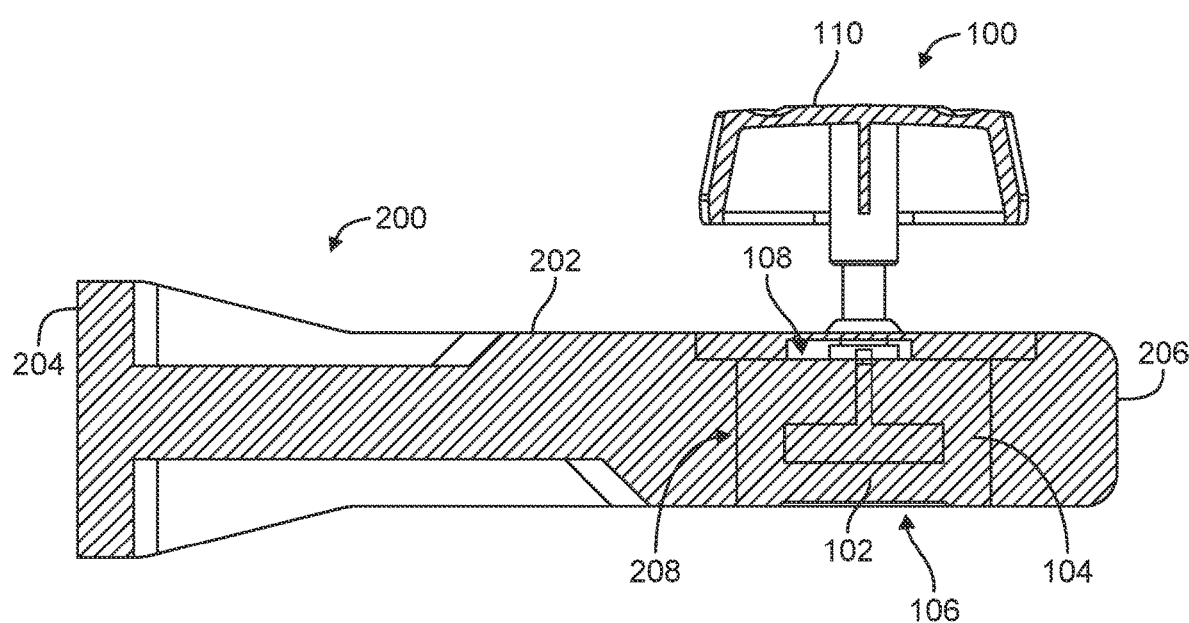
FIG. 7 shows a side sectional view of the printer arm configured with a magnetic locking assembly of FIG. 6 in accordance with exemplary embodiments hereof.

FIG. 6 shows a schematic of the magnetic locking assembly 100 coupled with the printer arm assembly 200, and FIG. 7 shows as sectional side view of the same.

In some embodiments, as shown in FIGS. 6-7, the printer arm assembly 200 includes a print arm 202 including a first end 204 (e.g., a proximal end) and a second end 206 (e.g., a distal end). In some embodiments, the first end 204 is configured with a lifting mechanism (e.g., an elevator) of a 3D printing system, and the second end 206 is releasably configured with the printing platform assembly 300. The magnetic locking assembly 100 is configured with the print arm's second end 206 to magnetically attach the printing platform assembly 300 thereto.

In some embodiments, as shown in FIGS. 6-7, the print arm 202 includes a cavity 208 designed to receive and secure the first and second magnets 102-1, 102-2 and the ferromagnetic housing 103 of the magnetic locking assembly 100. With the magnetic locking assembly 100 received and secured within the cavity 208, the lower surface 106 of the assembly 100 (e.g., a bottom surface of the assembly 100 and/or of the second magnet 102-2) is preferably positioned at a lower surface of the print arm 202. In this way, as will be described in other sections, when the printing platform assembly 300 is configured with the print arm 202, the lower surface 106 of the magnetic locking assembly 100 may generally abut with the printing platform's attraction plate 304 at the interface 306.

Figure 8:
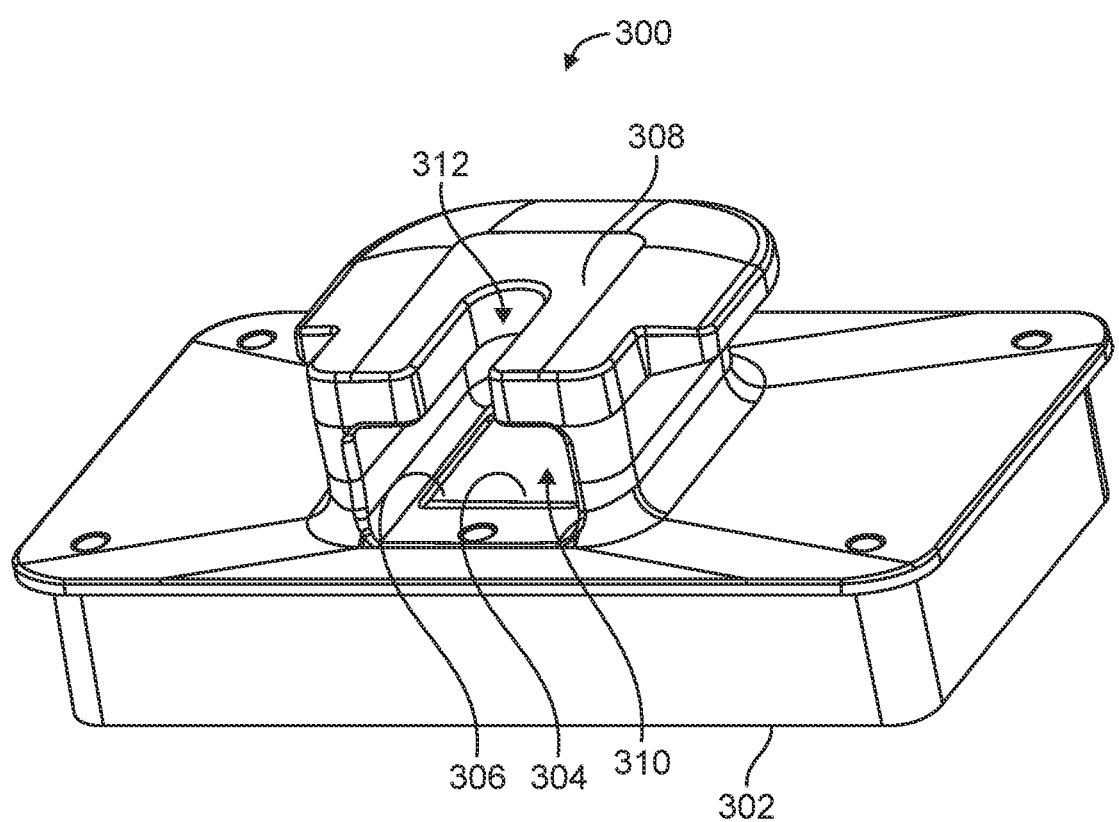
FIG. 8 shows aspects of a printing platform in accordance with exemplary embodiments hereof.

FIG. 8 shows a schematic of the printing platform assembly 300 showing the attraction plate 304 attached thereto.

In some embodiments, as shown in FIG. 8, the printing platform assembly 300 includes a printing platform 302 configured with one or more attraction plates 304. The attraction plate(s) 304 is preferably configured with an upper portion (e.g., an upper surface) of the platform 302, e.g., at the interface 306. The assembly 300 includes an upper section 308 defining a cavity 310 between the section 308 and the interface 306 (e.g., between the section 308 and an upper surface of the attraction plate 304). As will be described in other sections, the cavity 310 is designed to receive the second end 206 of the print arm 202 including at least a portion of the magnetic locking assembly 100. In some embodiments, the upper section 308 includes an upper channel 312 (e.g., a cutout in the upper section 308) designed to receive a portion of the magnetic locking assembly's activation mechanism 110 (e.g., a knob) when the assemblies 100, 200, 300 are configured together.

Figure 9:
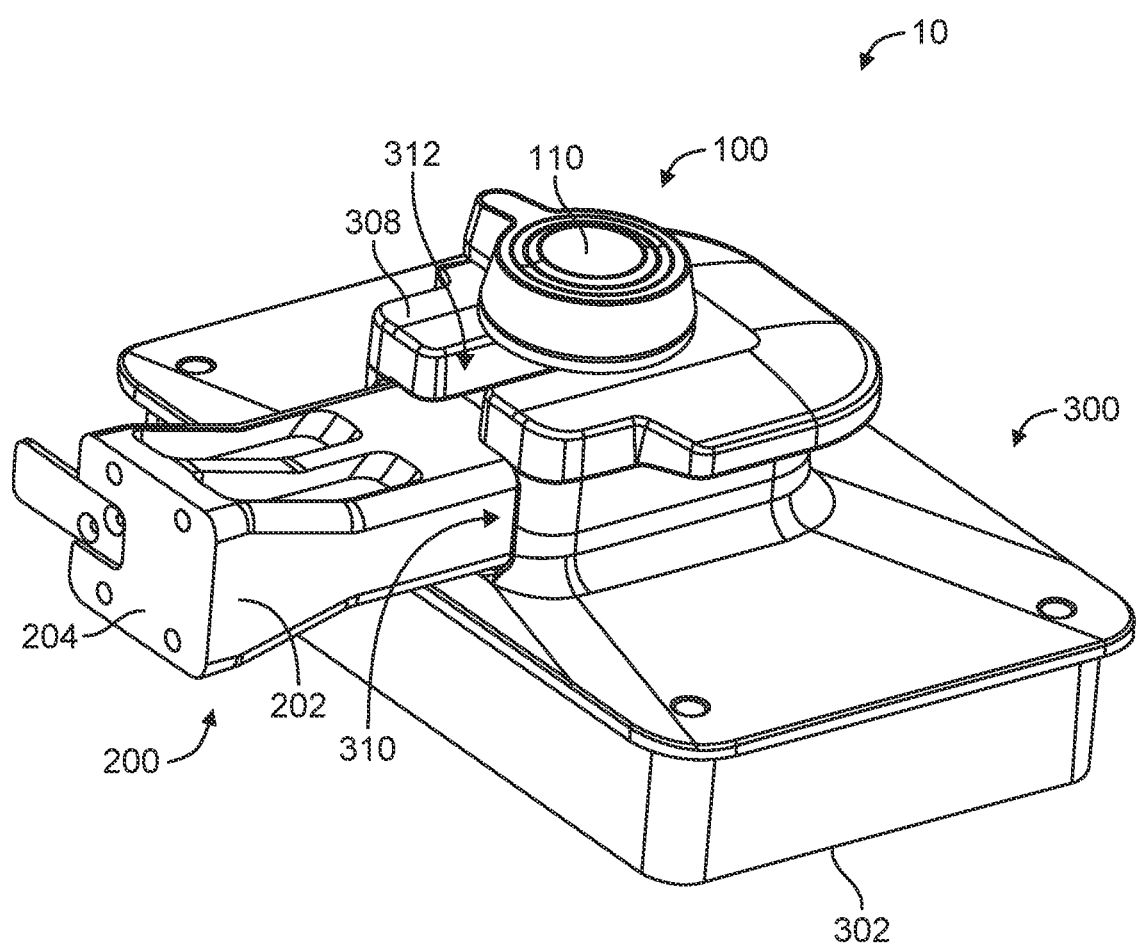
FIG. 9 shows aspects of a magnetic locking system configured with a printing arm and a printing platform in accordance with exemplary embodiments hereof.
Figure 10:
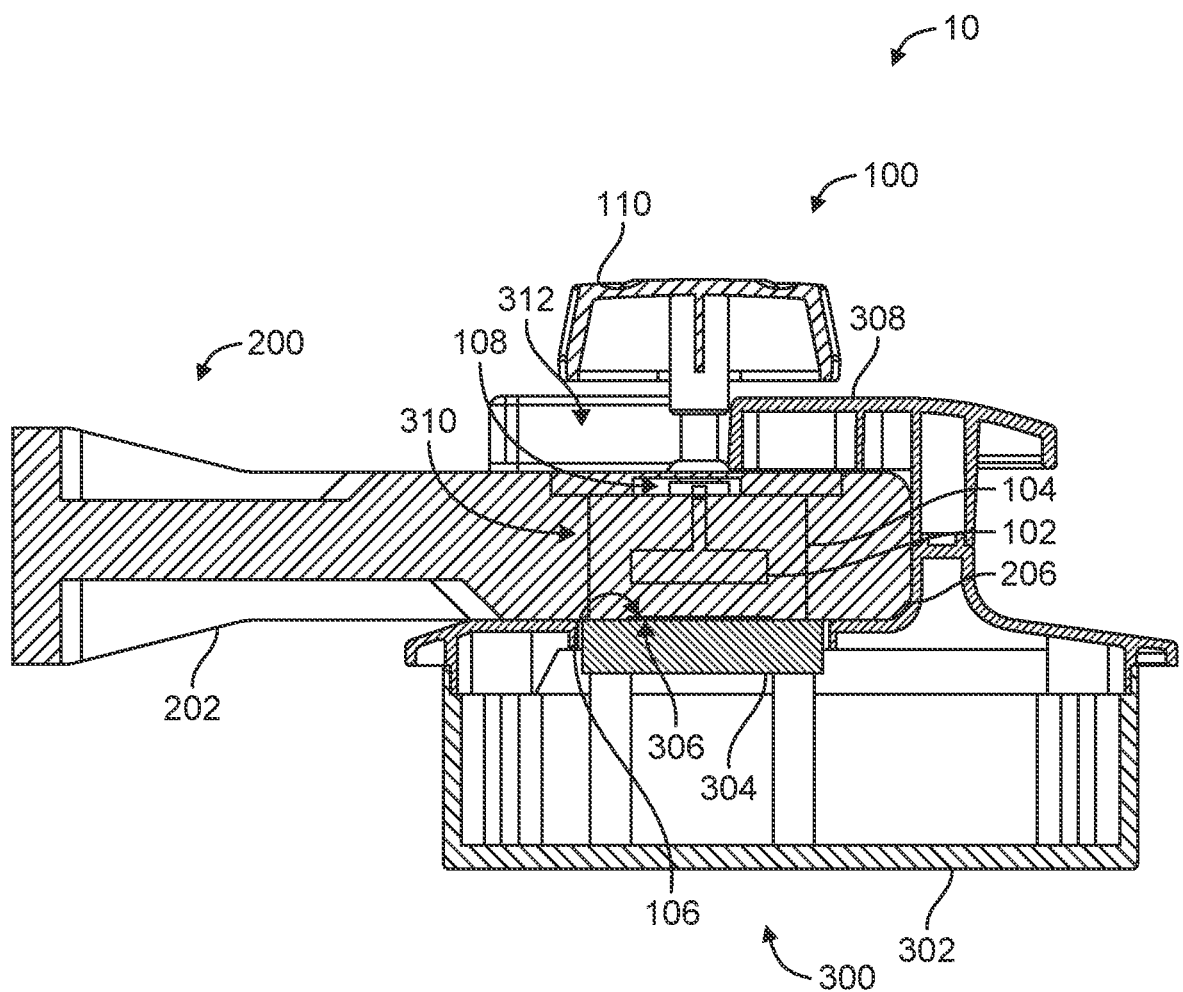
FIG. 10 shows a side sectional view of the magnetic locking system configured with a printing arm and a printing platform of FIG. 9 in accordance with exemplary embodiments hereof.

FIG. 9 shows a schematic of the assemblies 100, 200, 300 configured together to form a magnetic locking system 10 according to exemplary embodiments hereof, and FIG. 10 shows a side sectional view of the same.

In some embodiments, as shown in FIGS. 9-10, the distal end 206 of the print arm 202 (including at least a portion of the magnetic locking assembly 100 attached thereto) is received into the printer platform's channel 310. In this configuration, the lower surface 106 of the magnetic locking assembly 100 (e.g., a lower surface of the second magnet 102-2) and an upper surface of the platform's attraction plate 304 are aligned at the interface 306 and preferably abutted.

In addition, the magnetic locking assembly's activation mechanism 110 (e.g., its knob) passes upward through the upper section's upper channel 312 thereby exposing the upper portion of the mechanism 110 making it available to a user.

In some embodiments, as shown in FIGS. 9-10, the distal end 206 of the print arm 202 rests within the platform's channel 310, but no magnetic locking force is applied to the print arm 202 until the magnetic locking assembly 100 is activated. Once the magnetic locking assembly 100 is activated, a repeatable magnetic locking force is applied by the magnets 102-1, 102-2 to the attraction plate 304 thereby locking the printing platform assembly 300 to the printer arm assembly 200 via the magnetic locking assembly 100.

Figure 11:
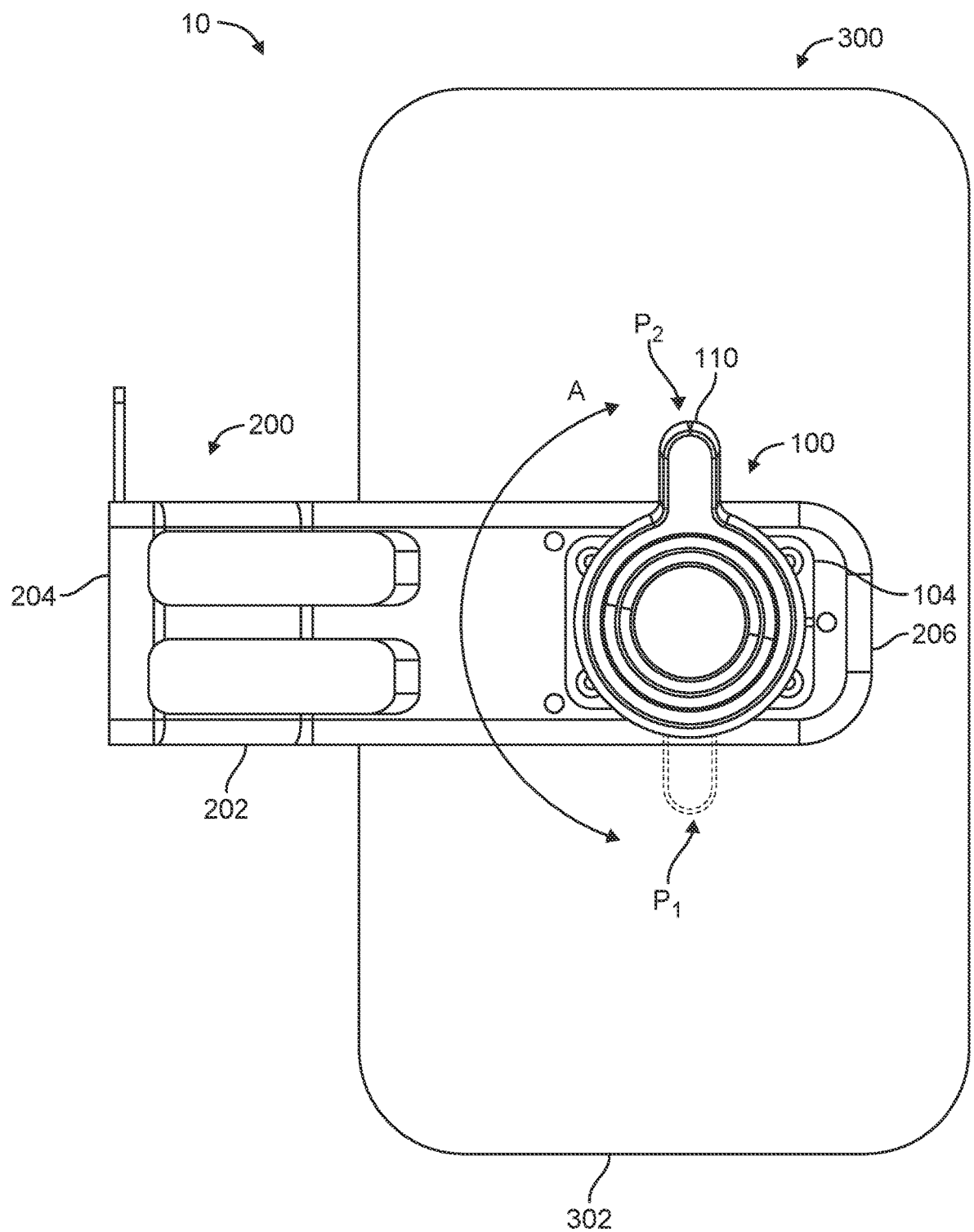
FIG. 11 shows a top view of a magnetic locking system configured with a printing arm and a printing platform in accordance with exemplary embodiments hereof.

FIG. 11 shows a top view of the assemblies 100, 200, 300 configured together to form a magnetic locking system 10 according to exemplary embodiments hereof. The upper section 308 has been omitted for clarity.

In some embodiments, as shown in FIG. 11, the activation mechanism 110 (e.g., the knob) is rotatable in the directions as represented by the arrow B. In some embodiments, when the mechanism 110 is rotated to the second position P2, the magnetic locking assembly 100 is deactivated, no locking force is applied, and the printing platform assembly 300 may be easily removed from the printer arm assembly 200 by sliding the printer arm 202 out of the channel 310. In this configuration, the printing platform assembly 300 also may be easily installed onto the printer arm assembly 200 by sliding the printer arm 202 into the channel 310. In some embodiments, when the mechanism 110 is rotated to the first position P1, the magnetic locking assembly 100 is activated, thereby applying a magnetic locking force, and the printing platform assembly 300 is locked to the printer arm assembly 200.

In some embodiments, it may be preferable that the activation mechanism 110 (e.g., the knob) include detents (or similar) that provide haptic feedback to the user when the mechanism 110 is properly positioned in the first position P1, and when the mechanism 110 is properly positioned in the second position P2. In this way, a user may simply rotate the mechanism 110 to either position P1, P2 until he/she feels the detents engage thereby confirming that the mechanism 110 has been properly positioned.

It is understood that any aspect or element of any embodiment of the system 10 described herein or otherwise may be combined with any other aspect or element of any other embodiment of the system 10 to form additional embodiments of the system 10, all of which are within the scope of the system 10.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more." and includes the case of only one. Thus, e.g., the phrase "at least some ABCs" means "one or more ABCs," and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only," the phrase "based on X" does not mean "based only on X."

As used herein, including in the claims, the phrase "using" means "using at least," and is not exclusive. Thus. e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus. e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A magnetic locking system for use in securing a print arm to a printing platform within a three-dimension (3D) printing system, the magnetic locking system, comprising:
   a member configured with the printing platform and comprising a material that is attractable to magnetic forces;
   one or more magnets configured with the print arm and configurable to apply attractive magnetic force to the member;
   a magnet moving mechanism including one or more activation mechanisms, wherein the magnet moving mechanism is configured to repeatably apply a moving charge to repeatably toggle at least one of the one or more magnets between a first position and a second position and provide a repeatable and releasable locking force;
   wherein when in the first position, the one or more magnets provide a repeatable first attractive magnetic force with respect to the member, and when in the second position, the one or more magnets provide a repeatable second attractive magnetic force with respect to the member; and
   wherein the repeatable first attractive magnetic force holds the member at an interface between the member and the one or more magnets, and the repeatable second attractive magnetic force releases the member from the interface.

2. The magnetic locking system of claim 1, wherein the one or more activation mechanism includes one or more detents.

3. The magnetic locking system of claim 2, wherein the one or more detents are configured to engage when the one or more magnets are positioned in the first position and the second position.

4. The magnetic locking system of claim 2, wherein the one or more detents are configured to provide haptic feedback when engaged.

5. A magnetic locking system for use in securing a print arm to a printing platform within a three-dimension (3D) printing system, the magnetic locking system, comprising:
   a member configured with the printing platform and comprising a material that is attractable to magnetic forces;
   one or more magnets configured with the print arm and configurable to apply attractive magnetic force to the member;
   a magnet moving mechanism including one or more activation mechanisms including one or more detents configured to provide haptic feedback when engaged, wherein the magnet moving mechanism is configured to repeatably apply a moving charge to repeatably toggle at least one of the one or more magnets between a first position and a second position and provide a repeatable and releasable locking force;
   wherein when in the first position, the one or more magnets provide a repeatable first attractive magnetic force with respect to the member, and when in the second position, the one or more magnets provide a repeatable second attractive magnetic force with respect to the member; and
   wherein the repeatable first attractive magnetic force holds the member at an interface between the member and the one or more magnets, and the repeatable second attractive magnetic force releases the member from the interface.

\* \* \* \* \*